US012002670B2

(12) United States Patent
Maeda (10) Patent No.: US 12,002,670 B2
(45) Date of Patent: Jun. 4, 2024

(54) CHROMATOGRAPH MASS SPECTROMETER (71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 330 days.

(21) Appl. No.: 17/597,046

(22) PCT Filed: Jul. 4, 2019

(86) PCT No.: PCT/JP2019/026607
§ 371 (c)(1),
(2) Date: Dec. 23, 2021

(87) PCT Pub. No.: WO2021/001985
PCT Pub. Date: Jan. 7, 2021

(65) Prior Publication Data
US 2022/0246415 A1 Aug. 4, 2022

(51) Int. Cl.
H01J 49/00 (2006.01)
G01N 30/72 (2006.01)
H01J 49/04 (2006.01)

(52) U.S. Cl.
CPC ...... *H01J 49/0431* (2013.01); *G01N 30/7266* (2013.01); *H01J 49/0036* (2013.01)

(58) Field of Classification Search
CPC ............... H01J 49/0431; H01J 49/0036; H01J 49/0027; G01N 30/7266; G01N 27/62; G01N 30/72

(Continued)

(56) References Cited

U.S. PATENT DOCUMENTS 8,916,818 B2 12/2014 Sekiya
2012/0108448 A1 5/2012 Kuhlmann et al.
2016/0209378 A1* 7/2016 Kobayashi .......... H01J 49/4225

FOREIGN PATENT DOCUMENTS

CN 103376301 A 10/2013
CN 105492903 A 4/2016
(Continued)

OTHER PUBLICATIONS

Written Opinion for PCT/JP2019/026607, dated Sep. 3, 2019.
(Continued)

*Primary Examiner* — Michael Maskell
(74) *Attorney, Agent, or Firm* — Sughrue Mion, PLLC (57) ABSTRACT A chromatograph mass spectrometer includes: a chromatograph unit configured to separate components in a sample; a mass spectrometer configured to perform measurement on ions having a specific mass-to-charge ratio derived from each compound temporally separated by the chromatograph unit, an analysis condition setting unit configured to allow a user to set, as an analysis condition, molecular-weight-related information and a mass-spectrometry-related parameter including an ion polarity, a type of an adduct, a number of polymerizations of a multimer and/or an ion valence for each measurement target compound; and an analysis method creator configured to calculate a mass-to-charge ratio of one or a plurality of types of ions according to the analysis condition set by the analysis condition setting unit for the each measurement target compound, and create an analysis method for performing mass spectrometry on the one or a plurality of types of ions in a time division manner.

6 Claims, 5 Drawing Sheets (58) Field of Classification Search
USPC .................................................. 250/281, 282
See application file for complete search history.

(56) References Cited

FOREIGN PATENT DOCUMENTS

| | | |
|---|---|---|
| DE | 10 2011 083 782 A1 | 5/2012 |
| JP | 2012-98276 A | 5/2012 |
| JP | 2013-224858 A | 10/2013 |
| WO | 2015/029101 A1 | 3/2015 |

OTHER PUBLICATIONS

International Search Report for PCT/JP2019/026607, dated Sep. 3, 2019.
Notice of Allowance dated Nov. 22, 2022 from the Japanese Patent Office in JP Application No. 2021-529649.
Chinese Office Action issued Feb. 29, 2024 in Application No. 201980097484.7.

\* cited by examiner

Fig. 2

| COMPOUND NAME | MOLECULAR WEIGHT | RETENTION TIME | POLARITY | VALENCE | ADDUCT | MULTIMER |
|---|---|---|---|---|---|---|
| A | 300 | 5 | +/− | +;1,2 −;1 | +; H, Na, K, NH₄ / −; H,HCOO, CH₃COO | 2, 3 |
| B | 500 | 7 | +/− | +;1,2 −;1 | +; H, Na, K / −; H,HCOO | |

Fig. 3

| m/z | POLARITY | MEASUREMENT TIME RANGE [min] | COMPOUND NAME | ION SPECIES |
|---|---|---|---|---|
| 301 | + | 3.0~7.0 | A | M+H |
| 318 | + | 3.0~7.0 | A | M+Na |
| 339 | + | 3.0~7.0 | A | M+NH$_4$ |
| 323 | + | 3.0~7.0 | A | M+K |
| 151 | + | 3.0~7.0 | A | (M+2H)/2 |
| 168 | + | 3.0~7.0 | A | (M+2Na)/2 |
| 189 | + | 3.0~7.0 | A | (M+2NH$_4$)/2 |
| 173 | + | 3.0~7.0 | A | (M+K)/2 |
| 299 | − | 3.0~7.0 | A | M-H |
| 345 | − | 3.0~7.0 | A | M+HCOO- |
| 359 | − | 3.0~7.0 | A | M+CH$_3$COO- |
| 501 | + | 5.0~9.0 | B | M+H |
| 518 | + | 5.0~9.0 | B | M+Na |
| 523 | + | 5.0~9.0 | B | M+K |
| 251 | + | 5.0~9.0 | B | (M+2H)/2 |
| 268 | + | 5.0~9.0 | B | (M+2Na)/2 |
| 289 | + | 5.0~9.0 | B | (M+2K)/2 |
| 499 | − | 5.0~9.0 | B | M-H |
| 545 | − | 5.0~9.0 | B | M+HCOO- |

Fig. 5

| COMPOUND NAME: | ○○○ | (EITHER IS ACCEPTABLE) |
| --- | --- | --- |
| CHEMICAL FORMULA: | | |

POLARITY: ☑ +   ☑ −

RETENTION TIME: [ 5 ] min

VALENCE: + [ 1,2 ] VALANCE   − [ 1 ] VALANCE

NUMBER OF POLYMERIZATIONS OF MULTIMER: [ 2, 3 ]

ADDUCT: ☑ H+   ☑ Na+   ☐ K+   ☐ NH4+   ☐ [ ]
☑ H-   ☑ HCOO+   ☐ CH3COO+   ☐ Cl+   ☐ [ ]

(ION FORMULA OR MASS)

CHROMATOGRAPH MASS SPECTROMETER

CROSS REFERENCE TO RELATED APPLICATIONS

This application is a National Stage of International Application No. PCT/JP2019/026607 filed Jul. 4, 2019.

TECHNICAL FIELD

The present invention relates to a chromatograph mass spectrometer, in which a chromatograph and a mass spectrometer are combined, such as a gas chromatograph mass spectrometer (GC-MS) or a liquid chromatograph mass spectrometer (LC-MS).

BACKGROUND ART

Chromatograph mass spectrometers which consist of the combination of a chromatograph, such as a liquid chromatograph (LC) or gas chromatograph (GC), and a mass analyzer, such as a quadrupole mass analyzer, have been widely used in order to perform qualification or quantitative determination of various components in a sample. In general, in a case where quantitative determination of a target compound is performed utilizing a chromatograph mass spectrometer, a selected ion monitoring (SIM) measurement for selectively and repeatedly detecting ions having one or a plurality of mass-to-charge ratios (m/z) corresponding to the target compound is performed within a predetermined measurement time range including a retention time at which the target compound is estimated to be eluted from a column of a chromatograph and introduced into a mass spectrometer. Therefore, when quantitative determination is performed for a large number of measurement target compounds that are or may be contained in a sample, it is necessary to set in advance a measurement time range and one or a plurality of mass-to-charge ratios to be subjected to SIM measurement for each measurement target compound as an analysis condition.

For example, in a chromatograph mass spectrometer described in Patent Literature 1, when an operator inputs a measurement time range, a mass-to-charge ratio, and the like for performing SIM measurement on a method-editing window displayed on a screen of a display unit, various parameters necessary for execution of measurement are computed based on an analysis condition thus input. Then, when the operator instructs execution of analysis, the analysis according to the analysis condition input and computed is performed.

The polarity of ions derived from a compound generated in an ion source of the mass spectrometer varies depending on the type of the compound, and often ions having both positive and negative polarities may be generated. Particularly in an ion source by an electrospray ionization (ESI) method or the like used for LC-MS, not only protonated ions and proton-eliminated ions of a compound derived from a sample but also adduct ions to which various substances (adducts) derived from a mobile phase or the like are added are easily generated, and multivalent ions with more than one valency are also easily generated. Depending on the compound, multimer ions such as dimer ions and trimer ions may be generated. In order to improve the detection sensitivity and quantitative accuracy of the compound, it is desirable to select an ion having the highest ionic intensity among various ions generated from one target compound and set the mass-to-charge ratio of the ion as an object of SIM measurement.

However, the ion polarity, the type of adduct ion, the ion valence, and the like, which are optimal for such measurement, are often unknown, and in such a case, it is necessary to combine these conditions and set the mass-to-charge ratio of a plurality of kinds of ions that may be generated as the mass-to-charge ratio of a SIM measurement target corresponding to one measurement target compound.

CITATION LIST

Patent Literature

Patent Literature 1: WO 2015/029101 A

SUMMARY OF INVENTION

Technical Problem

When there are many measurement target compounds as in multi-component simultaneous analysis, the operator needs to calculate the mass-to-charge ratios of a plurality of kinds of ions that may be generated for each measurement target compound and set the mass-to-charge ratio as the mass-to-charge ratio of the SIM measurement target, and the operation is very complicated and troublesome. Although an operator who has a certain degree of technical knowledge about mass spectrometry can perform such operation, it is difficult for an operator who does not have such knowledge and is unfamiliar with mass spectrometry to perform such operation. Further, it is possible for the operator to perform inappropriate analysis by performing incorrect setting.

The present invention has been made to solve such problems, and an object of the invention is to provide a chromatograph mass spectrometer that reduces workload of setting an analysis condition in chromatograph mass spectrometry and allows even an operator who is unfamiliar with mass spectrometry to set the analysis condition relatively easily and without errors.

Solution to Problem

A chromatograph mass spectrometer according to a first aspect of the present invention made to solve the above problems includes: a chromatograph unit configured to separate components in a sample; and a mass spectrometer configured to perform measurement on ions having a specific mass-to-charge ratio derived from each compound temporally separated by the chromatograph unit, and the chromatograph mass spectrometer further includes:

an analysis condition setting unit configured to allow a user to set, as an analysis condition, molecular-weight-related information and a mass-spectrometry-related parameter including at least one of an ion polarity, a type of an adduct, a number of polymerizations of a multimer or an ion valence for each measurement target compound; and an analysis method creator configured to calculate a mass-to-charge ratio of one or a plurality of types of ions according to the analysis condition set by the analysis condition setting unit for the each measurement target compound, and create an analysis method for performing mass spectrometry on the one or a plurality of types of ions in a time division manner.

The above chromatograph unit is a gas chromatograph or a liquid chromatograph. The mass spectrometer is typically a quadrupole mass spectrometer or a triple quadrupole mass spectrometer.

Advantageous Effects of Invention

In the chromatograph mass spectrometer according to the first aspect of the present invention, the operator (user) sets, by the analysis condition setting unit, the mass-spectrometry-related parameters that are easy to intuitively understand, such as the ion polarity, the type of adduct (the type of substance added to an original ion), the number of polymerizations of the multimer, and the ion valence, in addition to the molecular weight for example, for each measurement target compound. In response to this, the analysis method creator calculates mass-to-charge ratios of a plurality of types of ions based on a combination of the molecular weight and the mass-spectrometry-related parameter set as described above for each measurement target compound, and automatically creates an analysis method for performing mass spectrometry on the calculated ions in a time division manner.

According to the chromatograph mass spectrometer according to the first aspect of the present invention, such troublesome work becomes unnecessary that the operator himself creates a combination of the mass-spectrometry-related parameters and calculates and inputs the mass-to-charge ratio of ions that may be generated as a result. Thus, it is possible to reduce workload of the operator regarding the setting of the analysis condition. Even an operator who is unfamiliar with mass spectrometry can set the analysis condition relatively easily and without errors.

DESCRIPTION OF EMBODIMENTS

Hereinafter, an LC-MS according to an embodiment of the present invention will be described with reference to the accompanying drawings.

Figure 1:
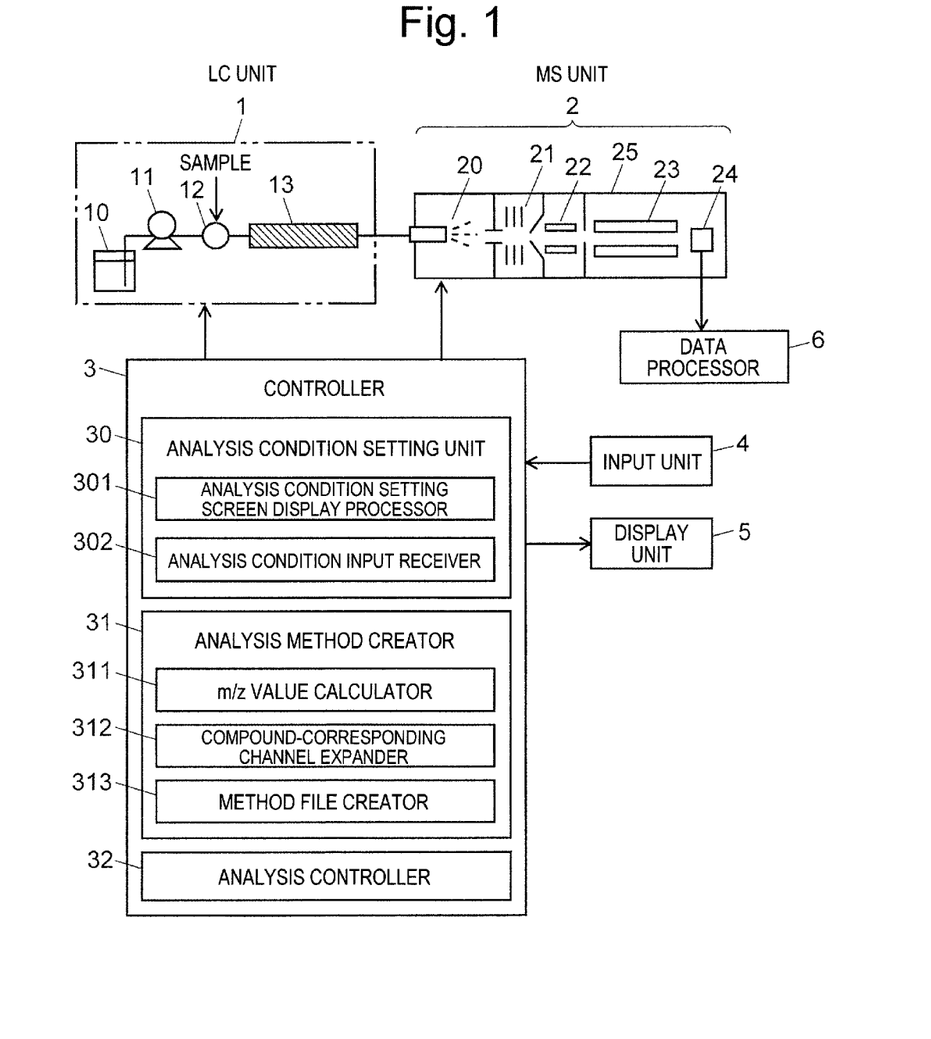
FIG. 1 is a configuration diagram of a main part of an LC-MS according to an embodiment of the present invention.

FIG. 1 is a configuration diagram of a main part of the LC-MS of the present embodiment.

The LC-MS of the present embodiment includes a liquid chromatograph unit (LC unit) 1 and a mass spectrometer unit (MS unit) 2 as measurement units, a controller 3, an input unit 4, a display unit 5, and a data processor 6.

The LC unit 1 includes a mobile phase container 10 that stores a mobile phase, a liquid feeding pump 11 that draws the mobile phase and delivers the mobile phase at a fixed flow rate, an injector 12 that injects a sample into the mobile phase at a predetermined timing, a column 13 that separates various compounds in the sample in a time direction, and the like.

The MS unit 2 includes an ionization unit 20 that ionizes a compound contained in a liquid sample eluted from the column 13, ion guides 21 and 22 that transport generated ions, a quadrupole mass filter 23 that selectively allows ions having a specific mass-to-charge ratio m/z among ions derived from one compound to pass, a detector 24 that detects selected ions, and the like. The ionization unit 20 is, for example, an ion source that uses an atmospheric pressure ionization method such as an ESI method for ionizing a compound in a liquid sample under an atmospheric pressure ambience, and the inside of the chamber 25 is partitioned into a plurality of rooms in which the degree of vacuum increases stepwise.

The controller 3 that controls each of the LC unit 1 and the MS unit 2 includes, as functional blocks, an analysis condition setting unit 30, an analysis method creator 31, and an analysis controller 32. As lower functional blocks, the analysis condition setting unit 30 includes an analysis condition setting screen display processor 301 and an analysis condition input receiver 302, and the analysis method creator 31 includes an m/z value calculator 311, a compound-corresponding channel expander 312, and a method file creator 313.

The controller 3 and the data processor 6 can include a personal computer having a CPU, a memory, and the like as hardware, and dedicated control and processing software installed in advance in the computer is executed on the computer to realize at least a part of the functions.

Now, the LC/MS analysis operation executed by the LC unit 1 and the MS unit 2 in the LC-MS of the present embodiment will be briefly described.

In the LC unit 1, the mobile phase is drawn from the mobile phase container 10 from the liquid feeding pump 11 and fed to the column 13 at a fixed flow rate. When the liquid sample is injected into the mobile phase in the injector 12 at a predetermined timing under the control of the analysis controller 32, the injected sample is pushed by the mobile phase and introduced into the column 13. Then, various compounds in the sample are separated in the time direction by interaction with the liquid phase of the column 13 while passing through the column 13, and are eluted from the outlet of the column 13 in a temporally shifted manner.

Generally, when quantitative analysis of a specific compound having a known molecular weight, or checking of whether the compound is present in a sample or not (detection of presence or absence) is performed, the MS unit 2 repeatedly performs SIM measurement to measure a mass-to-charge ratio corresponding to the specific compound. In SIM measurement, the analysis controller 32 determines a voltage to be applied to the quadrupole mass filter 23 so that ions having a mass-to-charge ratio to be measured selectively pass through the quadrupole mass filter 23. The compounds in the eluate from the column 13 are ionized in the ionization unit 20, and the ions generated in the ionization unit 20 are transported by the ion guides 21 and 22 and introduced into the quadrupole mass filter 23. Among various ions derived from the compound, only ions having a specific mass-to-charge ratio depending on the voltage applied to the quadrupole mass filter 23 pass through the quadrupole mass filter 23 and enter the detector 24. The detector 24 outputs an ionic intensity signal corresponding to the amount of entering ions as a detection signal.

When SIM measurement on a certain compound is repeatedly executed within a measurement time range of a predetermined time duration around a retention time at which the compound is eluted from the column 13 and introduced into the MS unit 2, and a chromatogram (extracted ion chromatogram) showing a temporal change of a detection signal at that time is created in the data processor 6, a peak appears in the chromatogram in a case where the compound is contained in the sample. The area of this peak corresponds to the content of the compound. Accordingly, the amount (concentration) of the compound contained in the sample can be found by calculating the peak area on the chromatogram and comparing the peak area with a calibration curve created in advance.

Next, a characteristic analysis operation in the LC-MS of the present embodiment will be described.

Figure 2:
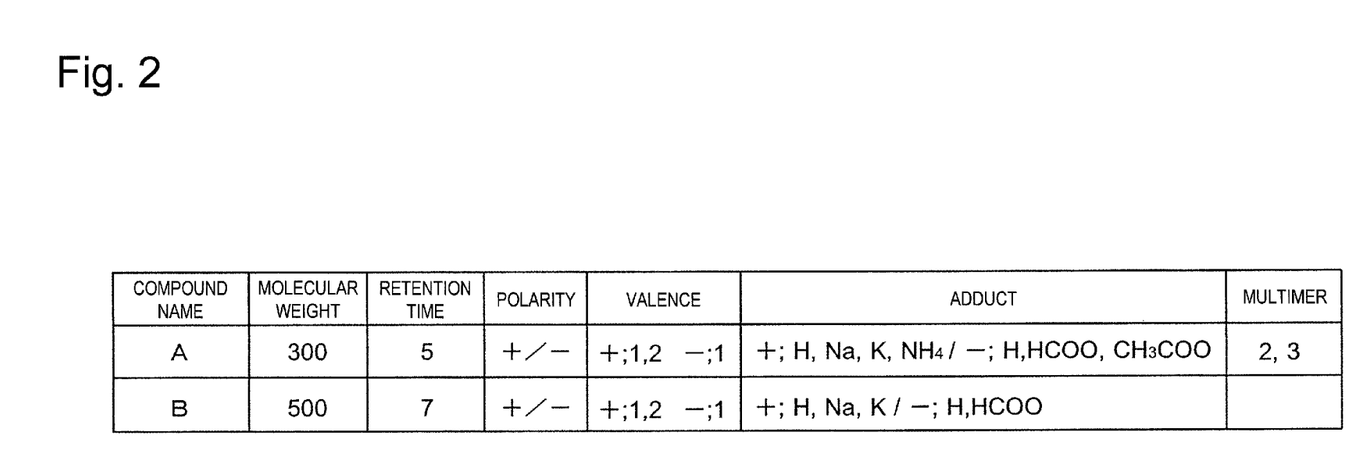
FIG. 2 is a diagram illustrating an example of an analysis condition setting table for each compound in the LC-MS of the present embodiment.

Here, it is assumed that multi-component batch analysis is performed to simultaneously detect a certain number of compounds that can be contained in a sample. First, an operator sets an analysis condition in advance for each compound to be measured. Specifically, when the operator gives a predetermined instruction through the input unit 4, the analysis condition setting screen display processor 301 of the analysis condition setting unit 30 displays, on the display unit 5, a screen including an analysis condition setting table for each compound as illustrated in FIG. 2. FIG. 2 illustrates a state in which a parameter corresponding to each compound has already been set, and in a case where the parameter has not been set, each field of the table is blank, or a default parameter is input.

In the analysis condition setting table for each compound, which is exemplified in FIG. 2, a plurality of parameters related to one compound are put together in one row. This parameter includes molecular-weight-related information such as molecular weight, LC-related information such as retention time, and MS-related information such as polarity, ion valence, the number of polymerizations of a multimer, and the type of adduct. The molecular-weight-related information may be any information capable of calculating the molecular weight of the compound other than a numerical value itself of the molecular weight, and may be a chemical formula, a molecular formula, a structural formula, or the like. The LC-related information may be any information capable of specifying a time range in which the compound is eluted from the column 13, and may be, in addition to the retention time, a time range, a relative index value of the retention time with respect to the retention time of a reference substance, or the like.

The polarity in the MS-related information can be selected from any of only a positive polarity (+), only a negative polarity (−), and both the positive polarity and the negative polarity. The valence can be set to any number from 1 to a predetermined number (for example, 10) by any number. In the example of FIG. 2, although the valence can be set for each of the positive polarity and the negative polarity, the valence may be set in common for the positive polarity and the negative polarity. As the type of adduct, for example, any number of appropriate types of adducts may be able to be set from adducts indicated by a pull-down menu or the like.

The operator appropriately sets the molecular-weight-related information, the LC-related information, and the MS-related information for each type of compound in the displayed analysis condition setting table for each compound. Of course, if there is no change in a parameter value or the like displayed by default, the operation may be terminated as it is. In the example of FIG. 2, for a compound A having a molecular weight of 300, both the positive polarity and the negative polarity are set as the polarity, two valences +1 and +2 for the positive polarity and only one valence −1 for the negative polarity are set, 2 and 3 are set as the number of polymerizations of the multimer, and four adduct types H (proton), Na, K, and $NH_4$ for the positive polarity and three adduct types H, HCOO, and $CH_3COO$ for the negative polarity are set. On the other hand, for a compound B having a molecular weight of 500, both the positive polarity and the negative polarity are set as the polarity, two valences +1 and +2 for the positive polarity and only one valence −1 for the negative polarity are set, and three adduct types H (proton), Na, and K for the positive polarity and three adduct types H, HCOO, and $CH_3COO$ for the negative polarity are set.

In addition, as the adduct type often observed in the ESI method, $H+CH_3CN$, $NH_4+CH_3CN$, $Na+CH_3CN$, and the like are known.

Then, when the parameters have been determined for all compounds to be measured, the operator instructs to save setting from the input unit 4. Then, the analysis condition input receiver 302 determines contents set in the analysis condition setting table for each compound and temporarily stores the contents in an internal storage unit. When a chemical formula, a molecular formula, a structural formula, or the like is set instead of the molecular weight, the analysis condition input receiver 302 automatically calculates the molecular weight from these formulas and stores information on the molecular weight.

Next, in the analysis method creator 31, the m/z value calculator 311 calculates, for each compound, a mass-to-charge ratio value of an ion species obtained by combining the valence and the adduct type from the molecular-weight-related information and the MS-related information. Taking the case of the compound A illustrated in FIG. 2 as an example, as illustrated on the right side of the table in FIG. 3, the mass-to-charge ratios of four types of ion species M+H, M+Na, $M+NH_4$, and M+K are determined in a positive monovalent ion, and the mass-to-charge ratios of four types of ion species (M+2H)/2, (M+2Na)/2, $(M+2NH_4)/2$, and (M+2K)/2 are determined in a positive divalent ion. In a negative monovalent ion, the mass-to-charge ratios of a total of three types of ion species M−H, $M+HCOO^-$, and $MM+CH_3COO^-$ are determined.

Figure 3:
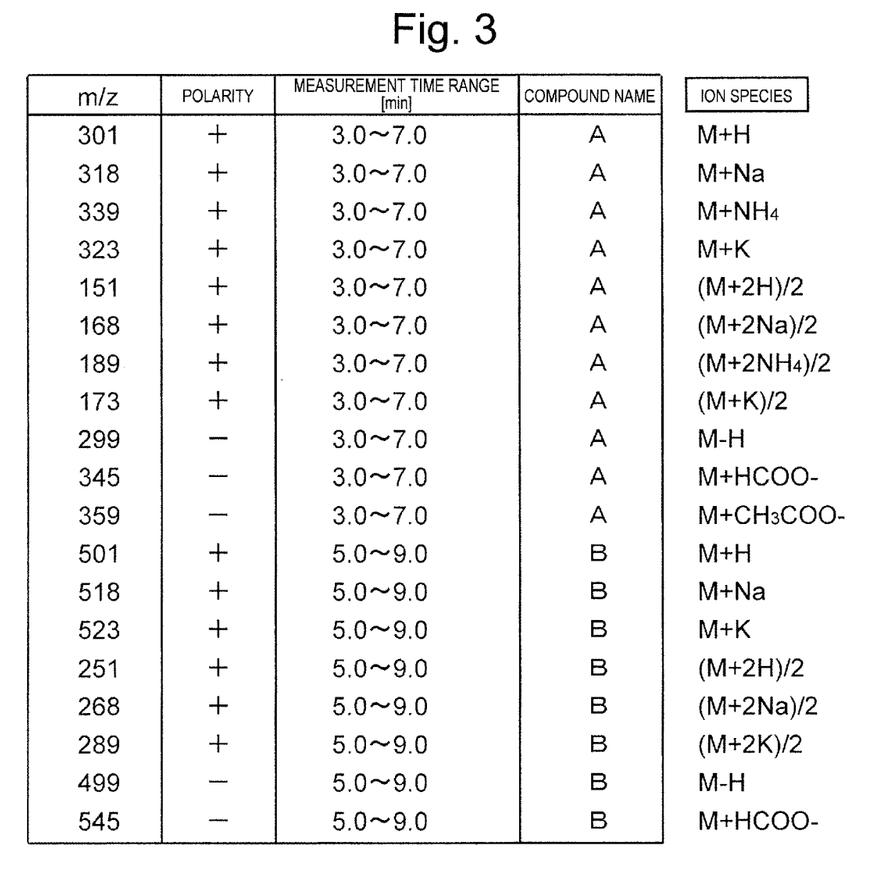
FIG. 3 is a diagram illustrating a SIM measurement condition table created for the analysis condition illustrated in FIG. 2.

The compound-corresponding channel expander 312 creates a SIM measurement condition table as illustrated in FIG. 3 in which each ion species determined for each compound as described above is taken as one analysis channel, one analysis channel is taken as one row, and the mass-to-charge ratio, polarity, measurement time range, and the like of ions are collected. The measurement time range at this time is obtained by adding a predetermined margin around the retention time set for the compound before and after the retention time, and ±2 min is set as the margin in the example of FIG. 3. Although this margin may be a default value, the user may appropriately set the margin. This is because deviation of an elution time of the compound in the LC unit 1 varies depending on an LC analysis condition, for example, the type of mobile phase, a mobile phase flow rate (flow velocity), the type of column, and the like.

When the retention time is not set for each compound in the analysis condition setting table for each compound, the measurement time range corresponding to the entire analysis time is set for all compounds.

The method file creator 313 creates a method file in a format that can be processed by the analysis controller 32 based on the analysis condition for each compound summarized in the SIM measurement condition table as described above. That is, for example, although the measurement time range for the compound A is 4 minutes between 3 and 7 minutes, within the time range, it is necessary to sequentially and repeatedly perform the SIM measurement for the 11 ion species described above. Within the measurement time range, in a time range of 2 minutes between 5 and 7 minutes, it is necessary to perform not only the SIM measurement for the ion species derived from the compound A but also the SIM measurement for the ion species derived from the compound B. Thus, the 313 determines a sequence for performing the SIM measurement of each row in the SIM measurement condition table, that is, each analysis channel in a time division manner, and creates a method file according to the sequence.

In the LC-MS of the present embodiment, a measurement execution procedure is determined by an operation unit called an event and an operation unit called a channel lower than the event. The channel is the operation unit corresponding to each of the analysis channels, and for example, in the SIM measurement, one channel is the SIM measurement of either the positive polarity or the negative polarity for one mass-to-charge ratio. On the other hand, the event can include a plurality of channels (may include only one channel), and is, in principle, the operation unit that performs the same type of measurement (for example, SIM measurement and scan measurement are the same type of measurements) and measurement with the same polarity for one compound. Accordingly, even for the SIM measurements for the same compound, the SIM measurements with different polarities are divided into different events. Although the scan measurement is not assumed in this example, when the SIM measurement and the scan measurement are performed together, these measurements are divided into different events. The concept of such events and channels is similar to that described in Patent Literature 1 and the like.

Figure 4:
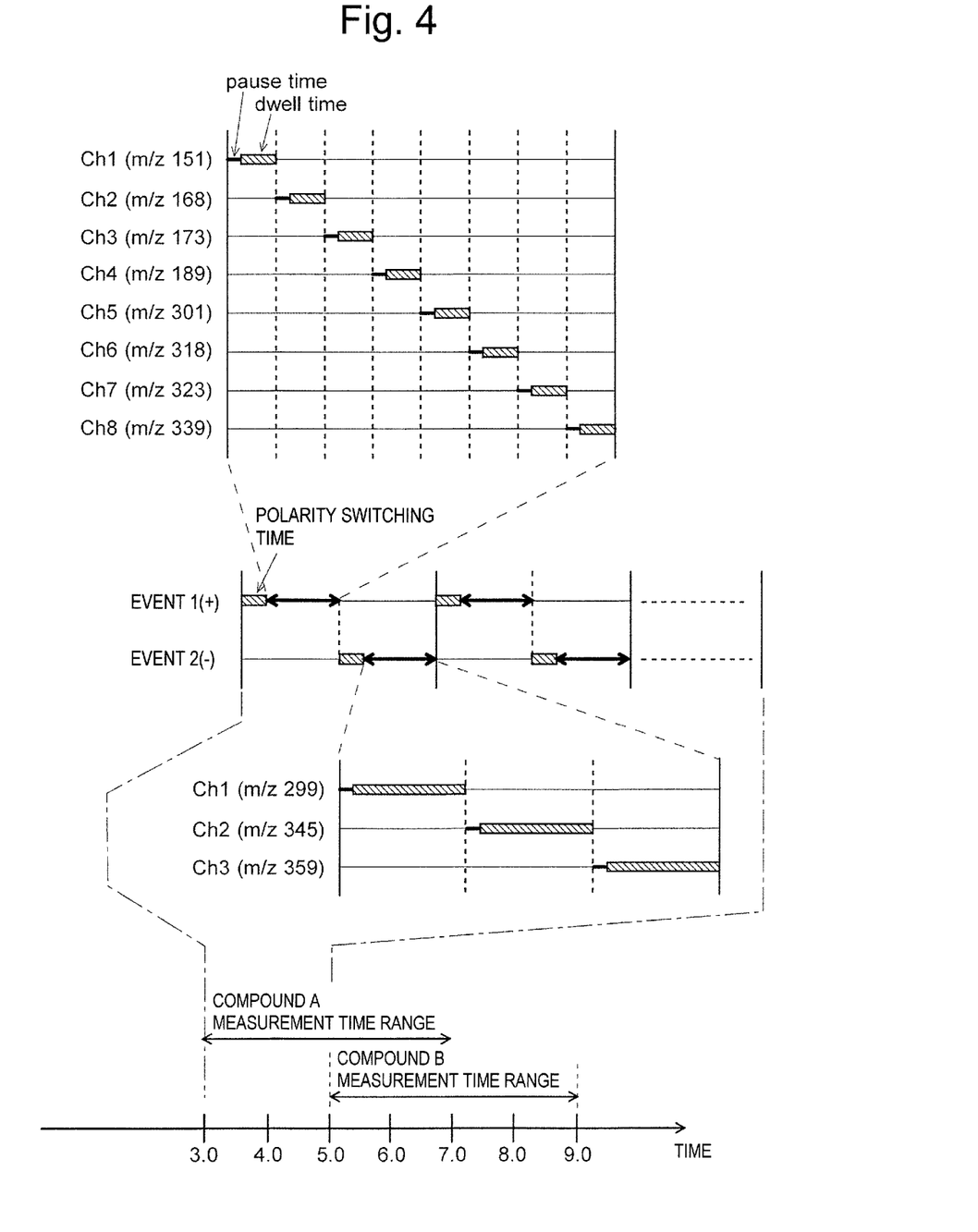
FIG. 4 is a diagram illustrating an example of an analysis sequence according to the SIM measurement condition table illustrated in FIG. 3.

FIG. 4 illustrates an analysis sequence in a time range of 3 to 5 minutes in which the measurement time range of the compound A and the measurement time range of the compound B do not overlap.

An event 1(+) is an event for performing the SIM measurement of the positive polarity for the compound A, and an event 2(−) is an event for performing the SIM measurement of the negative polarity for the compound A. The event 1(+) includes eight channels (Ch1 to Ch8) having different mass-to-charge ratios to be measured in the positive polarity, and the SIM measurements corresponding to the eight channels are sequentially executed one by one within an execution period of one event 1(+). On the other hand, the event 2(−) includes three channels (Ch1 to Ch3) having different mass-to-charge ratios to be measured in the negative polarity, and the SIM measurements corresponding to the three channels are sequentially executed one by one within an execution period of one event 2(−). Pause time in each channel is a time for switching a voltage applied to the quadrupole mass filter 23 so as to selectively allow ions having a mass-to-charge ratio to be measured to pass, and dwell time is a time for actually acquiring ionic intensity data in the SIM measurement.

In the time range of 3 to 5 minutes, two events to be executed are the event 1(+) and the event 2(−), and the two events are repeated alternately. Therefore, after all, the SIM measurement of the eight channels having different mass-to-charge ratios to be measured in the positive polarity and the SIM measurement of the three channels having different mass-to-charge ratios to be measured in the negative polarity are each sequentially performed once, and this routine is repeated. In the example illustrated in FIG. 4, an execution time of one event is determined in advance, and the execution time is divided by the channel included in the event; therefore, in the event 1(+) in which the number of channels included is large, a time allocated to each channel is short as compared to the event 2(−). This is an example, and for example, the execution time of the event may be adjusted according to the number of channels, and the time allocated to each channel may be equalized. An operation of sequentially executing the SIM measurement for a plurality of ion species (in this case, 11 types) derived from the compound A may be repeated without dividing the operation unit into two stages including the event and the channel.

In a time range of 5 to 7 minutes, the measurement time range of the compound A and the measurement time range of the compound B overlap. Thus, it is necessary to perform not only the SIM measurement for the ion species derived from the compound A but also the SIM measurement for the ion species derived from the compound B. In that case, an event 3(+) for performing the SIM measurement for the ion species of the positive polarity derived from the compound B and an event 4(−) for performing the SIM measurement for the ion species of the negative polarity derived from the compound B are added to the event 1(+) and the event 2(−), and these four events may be executed sequentially. The event 3(+) includes six channels having different mass-to-charge ratios to be measured in the positive polarity, and the event 4(−) includes two channels having different mass-to-charge ratios to be measured in the negative polarity. When the number of events is increased as described above, a time (loop time) required to execute all events once may be lengthened, or a time allocated to one event may be shortened by making the loop time constant.

In the time range of 7 to 9 minutes, only the SIM measurement for the ion species derived from the compound B may be executed, and therefore, only the two events including the event 3(+) and the event 4(−) may be repeatedly executed.

The method file creator 313 creates a method file for executing the analysis sequence determined as described above and stores the file in an internal storage. Then, the analysis controller 32 controls the LC unit 1 and the MS unit 2 according to the stored method file during analysis execution to execute the LC/MS analysis. As a result, analysis according to the analysis condition set by the user is executed, and a chromatogram (extracted ion chromatogram) corresponding to various ion species derived from the compound can be obtained for each compound.

Figure 5:
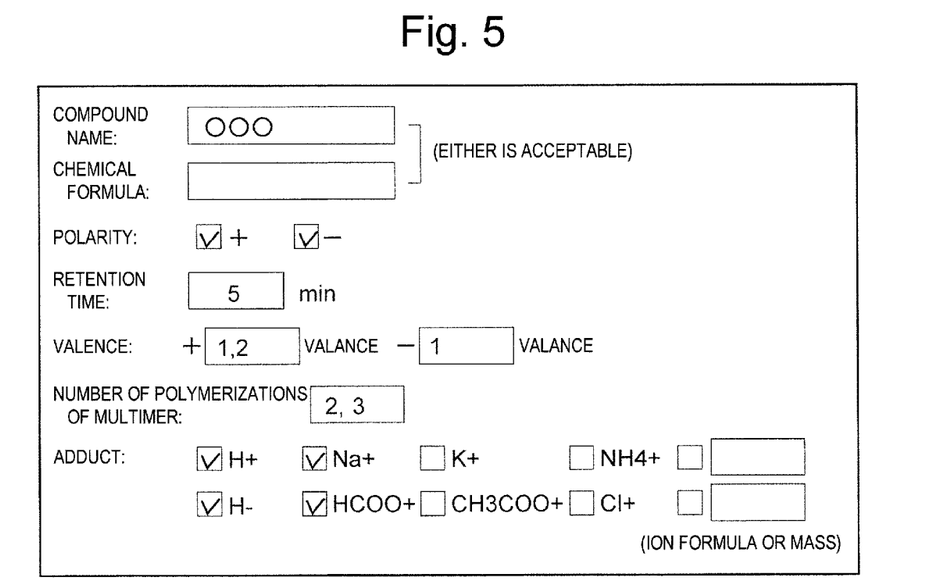
FIG. 5 is a diagram illustrating another example of an analysis condition setting screen in the LC-MS of the present embodiment.

In the LC-MS of the above embodiment, although the analysis condition (parameter) for a plurality of compounds can be set in the analysis condition setting table for each compound illustrated in FIG. 2, a similar parameter may be set in a dialog box as illustrated in FIG. 5 for each measurement target compound. Of course, as long as the molecular-weight-related information, the LC-related information, and the MS-related information can be set for each measurement target compound, the format and style of a user interface for the setting are not particularly limited.

The present invention is applied to an LC-MS including a single-type quadrupole mass spectrometer in the above embodiment. However, it is obvious that the present invention can also be applied to an LC-MS including a tandem mass spectrometer such as a triple quadrupole mass spectrometer. In that case, the ion valence and the type of adduct described above are the MS-related information on precursor ions. The MS-related information on product ions may be added thereto.

The above embodiment is merely an example of the present invention, and it is a matter of course that deformations, modifications, additions, and the like appropriately made within the scope of the gist of the present invention are included in the claims of the present application.

[Various Aspects]

It will be understood by those skilled in the art that the exemplary embodiments described above are specific examples of the following aspects.

(Clause 1) A chromatograph mass spectrometer according to an aspect of the present invention includes: a chromatograph unit configured to separate components in a sample; and a mass spectrometer configured to perform measurement on ions having a specific mass-to-charge ratio derived from each compound temporally separated by the chromatograph unit, and the chromatograph mass spectrometer further includes:

an analysis condition setting unit configured to allow a user to set, as an analysis condition, molecular-weight-related information and a mass-spectrometry-related parameter including at least one of an ion polarity, a type of an adduct, a number of polymerizations of a multimer or an ion valence for each measurement target compound; and an analysis method creator configured to calculate a mass-to-charge ratio of one or a plurality of types of ions according to the analysis condition set by the analysis condition setting unit for the each measurement target compound, and create an analysis method for performing mass spectrometry on the one or a plurality of types of ions in a time division manner.

According to the chromatograph mass spectrometer according to clause 1, such troublesome work becomes unnecessary that the operator himself creates a combination of the mass-spectrometry-related parameters and calculates and inputs the mass-to-charge ratio of ions that may be generated as a result. Thus, it is possible to reduce workload of the operator regarding the setting of the analysis condition. Even an operator who is unfamiliar with the mass spectrometry can set the analysis condition relatively easily and without errors, and while operability of the chromatograph mass spectrometer can be improved, work efficiency of measurement can be improved.

(Clause 2) In the chromatograph mass spectrometer according to clause 1, the analysis condition setting unit may include a display processor configured to display, on a screen of a display unit, a table in which the molecular-weight-related information and the mass-spectrometry-related parameter for one measurement target compound are associated in a row or in a column, and an input receiver configured to receive information input or selected in the table.

According to the chromatograph mass spectrometer according to clause 2, the molecular-weight-related information and the mass-spectrometry-related parameter for a plurality of the measurement target compounds can be confirmed in a list. Since it is not necessary to perform an operation such as switching the screen at the time of input or selection operation of the molecular-weight-related information and the mass-spectrometry-related parameter, it is easy to increase work efficiency.

(Clause 3) In the chromatograph mass spectrometer according to clause 1, the analysis condition setting unit may include a display processor configured to display, on a screen of a display unit, a dialog box for inputting or selecting, for each measurement target compound, molecular-weight-related information and a mass-spectrometry-related parameter for one measurement target compound, and an input receiver configured to receive information input or selected in the dialog box.

According to the chromatograph mass spectrometer according to clause 3, since the molecular-weight-related information and the mass-spectrometry-related parameter are input or selected using individual dialog boxes for a plurality of measurement target compounds one by one, work errors are less likely to occur.

(Clause 4) In the chromatograph mass spectrometer according to any one of clauses 1 to 3, the molecular-weight-related information may be a chemical formula or a molecular formula, and the chromatograph mass spectrometer may further include a molecular weight calculator configured to calculate a molecular weight from a chemical formula or a molecular formula input by the analysis condition setting unit, and the analysis method creator may be configured to create the analysis method after calculating the mass-to-charge ratio of one or a plurality of types of ions based on the molecular weight calculated by the molecular weight calculator.

According to the chromatograph mass spectrometer according to clause 4, when the molecular weight of the measurement target compound is unknown and the chemical formula and the molecular formula are known, it is not necessary for the operator to calculate the molecular weight each time, and operability can be improved.

(Clause 5) In the chromatograph mass spectrometer according to any one of clauses 1 to 4, the analysis condition setting unit may be configured to allow the user to further set measurement time information as the analysis condition for each measurement target compound, and the analysis method creator may be configured to create an analysis method for each measurement target compound so as to perform, in a time division manner, mass spectrometry on the one or a plurality of types of ions corresponding to the measurement target compound within a measurement time range based on the measurement time information.

According to the chromatograph mass spectrometer according to clause 5, mass spectrometry of various ions derived from the compound can be reliably performed with high sensitivity in accordance with a timing at which each compound is eluted from the chromatograph unit and introduced into the mass spectrometer.

(Clause 6) In the chromatograph mass spectrometer according to any one of clauses 1 to 5, the mass spectrometer may be a quadrupole mass spectrometer, and the mass spectrometry on the one or a plurality of types of ions may be a selected ion monitoring (SIM) measurement.

According to the chromatograph mass spectrometer according to clause 6, a chromatogram for a plurality of compounds contained in a sample is created by a simple operation, and the quantitative determination and presence or absence of the compound can be confirmed based on the chromatogram.

REFERENCE SIGNS LIST

1 . . . Liquid Chromatograph (LC) Unit
10 . . . Mobile Phase Container
11 . . . Liquid Feeding Pump
12 . . . Injector 13 . . . Column
2 . . . Mass Spectrometry (MS)
20 . . . Ionization Unit
21, 22 . . . Ion Guide
23 . . . Quadrupole Mass Filter
24 . . . Detector
25 . . . Chamber
3 . . . Controller
30 . . . Analysis Condition Setting Unit
301 . . . Analysis Condition Setting Screen Display Processor
302 . . . Analysis Condition Input Receiver
31 . . . Analysis Method Creator
311 . . . m/z Value Calculator
312 . . . Compound-Corresponding Channel Expander
313 . . . Method File Creator
32 . . . Analysis Controller
4 . . . Input Unit
5 . . . Display Unit
6 . . . Data Processor

The invention claimed is:

1. A chromatograph mass spectrometer comprising:
a chromatograph unit configured to separate components in a sample; and
a mass spectrometer configured to perform measurement on ions having a specific mass-to-charge ratio derived from each compound temporally separated by the chromatograph unit,
the chromatograph mass spectrometer further comprising:
an analysis condition setting unit configured to allow a user to set, as an analysis condition, molecular-weight-related information and a mass-spectrometry-related parameter including a type of an adduct and/or a number of polymerizations of a multimer for each measurement target compound; and
an analysis method creator configured to calculate a mass-to-charge ratio of one or a plurality of types of ions of a measurement target compound to which the adduct is added and/or polymerized, according to the type of the adduct and/or the number of polymerizations of the multimer set by the analysis condition setting unit for the each measurement target compounds, based on the molecular-weight-related information and the mass-spectrometry-related parameter including an ion polarity and an ion valence, and create an analysis method for performing mass spectrometry on the one or a plurality of types of ions in a time division manner.

2. The chromatograph mass spectrometer according to claim 1, wherein the analysis condition setting unit includes a display processor configured to display, on a screen of a display unit, a table in which the molecular-weight-related information and the mass-spectrometry-related parameter for one measurement target compound are associated in a row or in a column, and an input receiver configured to receive information input or selected in the table.

3. The chromatograph mass spectrometer according to claim 1, wherein the analysis condition setting unit includes a display processor configured to display, on a screen of a display unit, a dialog box for inputting or selecting, for each measurement target compound, the molecular-weight-related information and the mass-spectrometry-related parameter for one measurement target compound, and an input receiver configured to receive information input or selected in the dialog box.

4. The chromatograph mass spectrometer according to claim 1, wherein
the molecular-weight-related information is a chemical formula or a molecular formula, and the chromatograph mass spectrometer further includes a molecular weight calculator configured to calculate a molecular weight from a chemical formula or a molecular formula input by the analysis condition setting unit, and
the analysis method creator is configured to create the analysis method after calculating the mass-to-charge ratio of one or a plurality of types of ions based on the molecular weight calculated by the molecular weight calculator.

5. The chromatograph mass spectrometer according to claim 1, wherein the analysis condition setting unit is configured to allow the user to further set measurement time information as the analysis condition for each measurement target compound, and
the analysis method creator is configured to create an analysis method for each measurement target compound so as to perform, in a time division manner, mass spectrometry on the one or a plurality of types of ions corresponding to the measurement target compound within a measurement time range based on the measurement time information.

6. The chromatograph mass spectrometer according to claim 1, wherein the mass spectrometer is a quadrupole mass spectrometer, and the mass spectrometry on the one or a plurality of types of ions is a selected ion monitoring measurement.

* * * * *